Patented Feb. 21, 1928.

1,659,971

UNITED STATES PATENT OFFICE.

JAMES H. COLTON, OF BERKELEY, CALIFORNIA, ASSIGNOR TO PACIFIC PORTLAND CEMENT COMPANY, CONSOLIDATED, OF SAN FRANCISCO, CALIFORNIA, A CORPORATION OF CALIFORNIA.

PROCESS OF HARDENING AND AGING CALCINED GYPSUM PRODUCTS.

No Drawing. Application filed September 7, 1926. Serial No. 134,139.

This invention relates to the manufacture of calcined gypsum products.

When gypsum is calcined, two different products may be obtained, depending upon the amount of water vaporized from the product. When the residual water content of the gypsum is reduced to approximately 5 to 6 per cent, stucco or hard wall plaster is obtained. When the residual water content is reduced to from approximately ½ to 1 per cent, a product known as "casting plaster" is obtained. The product casting plaster produces a hard, dense material of considerable strength but if employed immediately after the calcining process, excessively heats upon the addition of water and is apt to produce a cracked surface, burn and pit the glue molds (when so used) and create large quantities of steam, causing pin holes in the casting. Accordingly, it is generally necessary, when producing a hard, dense plaster of considerable strength, to calcine gypsum to casting plaster of a residual water content of from ½ to 1 per cent, and then age the product for a considerable period of time in order to eliminate the excessive heating of the fresh calcined product.

An object of the present invention is to produce a product which is hard, dense, and of great strength and suitable for use as molding, casting, or finishing plaster which still possesses a comparatively high residual water content and does not require storing or otherwise aging before use.

An object of this invention is to provide a novel process of calcining and treating gypsum during calcination so as to produce gypsum during calcination so as to produce an artificially aged gypsum product having the desirable characteristics above described.

I have discovered that by adding borax to gypsum during the process of calcining the gypsum, I am able to produce a product of greater hardness and density and also of greater strength than the calcined gypsum products generally produced. I have further discovered that the product may be substantially improved through the addition of raw gypsum during the time of calcining. The addition of the raw gypsum during the calcining operation facilitates the production of a product fit for immediate use without excessive heating. Moreover, I have discovered that by the joint use of both borax and raw gypsum during the calcining process, I am able to produce a product fit for molding, casting, or finishing plaster, which product is hard, dense, possesses great strength, and is cold working.

Various objects and advantages of the present invention will be apparent from the description of a preferred form or example of a calcining process embodying the present invention. For this purpose, I have therefore hereinafter set forth a specific example of a process which embodies the present invention.

In the preferred process, the raw gypsum is introduced into the calciner or kettle in the usual manner. After the calciner is filled, it is heated until the contents start to boil. At this period of operation, I prefer to gradually add the borax. When continuous rotary calciners are used, the borax may be continuously introduced into the calcining system at any suitable point, but before the completion of the calcination. The borax may be added in either a dry state or in a solution, although I have so far determined that satisfactory results are obtained by adding the borax in a concentrated solution. The quantity of borax added is preferably within $\frac{1}{10}$ to 1 per cent by weight of the quantity of raw gypsum charged to the calciner. Preferably the smaller quantity is employed, and the raw gypsum and borax, or borax solution, are thoroughly agitated together during a further calcining operation. This agitation may usually be accomplished by the boiling action of the charge which violently boils to stir the admixture. In place of adding the borax (sodium biborate) after the raw gypsum has been introduced into the calciner or kettle and brought to a boil, partial results are obtained by admixing the borax with the raw material before the same are added to the calciner or immediately thereafter.

The admixed gypsum and borax are continually heated or calcined until after the completion of the so-called first boiling operation, at which time the temperature of the admixture in the kettle is around approximately 340° F., and the product has been reduced to material fit for wall or finishing plaster with a residual water content of from 5 to 6 per cent.

At this time, the calcining operation commences what is known as the second boiling operation, the operation which ordinarily results in the reduction of hard wall plaster to casting plaster, this change being effected at temperatures of about 380° to 420° F. thereby reducing the water content of the plaster to about 1% or even less. Preferably at sometime during or at the end of this second boiling operation, I add a predetermined quantity of gypsum in a raw or at least comparatively raw state. The raw gypsum is preferably added in a finely ground condition and in the proportions of approximately 25 per cent of raw gypsum to the weight of the charge being calcined. After the addition of the raw gypsum, the material is further calcined, preferably until the residual water is suitably reduced, for example, from 4 to 6 per cent. This operation should normally not exceed in temperature the temperature of the end point of a normal first boiling operation, that is about 340° F.

As a result of the above sequence of operations, it is found that a product is obtained which requires no storing or otherwise aging in order to permit the product to be immediately used but, on the other hand, a product is obtained which will produce a dense, hard material of great strength.

By the expression "temperature sufficient to obtain casting plaster", or the like, in the claims, I mean the temperatures usually employed commercially in obtaining casting plaster which, as previously stated, requires aging before it is in condition for use.

While the process herein described is well adapted to carry out the objects of the present invention, it is understood that various modifications may be made in the details of the process without departing from the present invention, and the invention, therefore, includes all such modifications and changes as come within the scope of the appended claims.

I claim:

1. A process of manufacturing a gypsum product which comprises calcining gypsum at a temperature sufficient to produce casting plaster, adding raw gypsum to the calcined gypsum, and further calcining the mixture to reduce its moisture content to from 4 to 6 per cent.

2. The process of manufacturing a gypsum product as stated in claim 1, including the step of adding sodium borate to the gypsum before the completion of the first calcining operation.

3. A process of manufacturing a gypsum product, which comprises calcining gypsum in the presence of sodium borate to reduce the moisture content to between ½ and 1 per cent, then adding raw gypsum and further calcining the mixture to reduce its moisture content to from 4 to 6 per cent.

4. A process of manufacturing artificially aged gypsum plaster, which comprises calcining raw gypsum at a temperature sufficient to produce casting plaster, adding about 25% by weight of raw gypsum to the calcined gypsum and then further calcining the mixture to obtain a product having the moisture content of an aged casting plaster.

5. A process of calcining gypsum, which comprises calcining raw gypsum in the presence of borax at a temperature sufficient to reduce the water content to between ½ and 1 per cent, then adding gypsum to the calcined material, and then recalcining at a lower temperature to produce an artificially aged casting plaster which is capable of immediate use.

6. A process of calcining gypsum, which comprises calcining raw gypsum at a temperature sufficient to produce casting plaster, then adding raw gypsum to the calcined material and then recalcining at a lower temperature to obtain as a final product artificially aged casting plaster which is capable of immediate use.

Signed at San Francisco, Calif., this 26 day of August, 1926.

JAMES H. COLTON.